United States Patent
Ichihara et al.

(10) Patent No.: US 7,563,021 B2
(45) Date of Patent: Jul. 21, 2009

(54) METHOD DEVICE AND RECORDING MEDIUM WHERE PROGRAM IS RECORDED, FOR DECIDING RESIDUAL TRAVEL LIFE AND END OF LIFE OF RUN-FLAT TIRE THAT CONTINUES TRAVELING IN RUN-FLAT CONDITION

(75) Inventors: Eiji Ichihara, Kodaira (JP); Yoshinori Imamura, Kodaira (JP); Takehiko Yamada, Kodaira (JP)

(73) Assignee: Bridgestone Corporation, Tokyo (JP)

( * ) Notice: Subject to any disclaimer, the term of this patent is extended or adjusted under 35 U.S.C. 154(b) by 235 days.

(21) Appl. No.: 10/524,262

(22) PCT Filed: Aug. 12, 2003

(86) PCT No.: PCT/JP03/10270

§ 371 (c)(1),
(2), (4) Date: Sep. 6, 2005

(87) PCT Pub. No.: WO2004/014671

PCT Pub. Date: Feb. 19, 2004

(65) Prior Publication Data

US 2006/0093015 A1  May 4, 2006

(30) Foreign Application Priority Data

Aug. 12, 2002 (JP) ............................. 2002-234472
Aug. 22, 2002 (JP) ............................. 2002-241333

(51) Int. Cl.
*G01K 3/00* (2006.01)
*G01K 3/04* (2006.01)
*G01K 1/12* (2006.01)

(52) U.S. Cl. .................... 374/46; 374/57; 374/143; 374/45; 374/102; 374/120

(58) Field of Classification Search .............. 374/4–5, 374/45–46, 57, 141–143, 153, 208, 102–105, 374/148; 340/501, 539.27, 447, 449, 442, 340/870.17; 73/146.2
See application file for complete search history.

(56) References Cited

U.S. PATENT DOCUMENTS 4,089,225 A * 5/1978 Kraska et al. .................. 73/614

(Continued)

FOREIGN PATENT DOCUMENTS

| JP | 62-87816 A | 4/1987 |
|----|------------|--------|
| JP | 2003-508299 A | 3/2003 |
| JP | 2003-511287 A | 3/2003 |

(Continued)

*Primary Examiner*—Gail Verbitsky
(74) *Attorney, Agent, or Firm*—Sughrue Mion, PLLC

(57) ABSTRACT

There are provided a process and the like for judging a residual lifetime of a run-flat tire and an end stage of the residual lifetime thereof during continuous running at a run-flat state. The process for judging the residual lifetime of the tire of the invention is characterized in that in a vehicle equipped with a run-flat tire system comprising run-flat tires 2 and detection units 4 each arranged in the respective tire 2 and capable of measuring an atmosphere temperature in at least an interior 3 of the tire 2, when the tire 2 is continuously run at the run-flat state by an extreme lowering of an internal pressure accompanied with the occurrence of puncture or the like, after a limit temperature being statistically an occurrence of trouble is previously set, the atmosphere temperature inside tire of the run-flat tire continuously running at the run-flat state is measured, and a runnable time and/or distance until the run-flat tire results in trouble is predicted by using the atmosphere temperature inside tire measured and data calculated therefrom.

8 Claims, 8 Drawing Sheets

U.S. PATENT DOCUMENTS

| | | | | |
|---|---|---|---|---|
| 4,763,517 A * | 8/1988 | Feinberg | ...................... | 73/146.8 |
| 5,071,259 A * | 12/1991 | Metzger et al. | .............. | 374/143 |
| 5,228,337 A * | 7/1993 | Sharpe et al. | ................ | 73/146.5 |
| 5,825,286 A * | 10/1998 | Coulthard | .................... | 340/447 |
| 5,911,094 A * | 6/1999 | Tsujimoto | .................... | 399/69 |
| 5,939,977 A * | 8/1999 | Monson | ...................... | 340/442 |
| 5,945,908 A * | 8/1999 | Nowicki et al. | .............. | 340/447 |
| 6,136,607 A * | 10/2000 | Conlon et al. | ................... | 436/8 |
| 6,243,007 B1 * | 6/2001 | McLaughlin et al. | ......... | 340/447 |
| 6,259,361 B1 | 7/2001 | Robillard et al. | | |
| 6,291,197 B1 * | 9/2001 | Whelihan | .................. | 435/7.92 |
| 6,412,977 B1 * | 7/2002 | Black et al. | ................. | 374/178 |
| 6,701,986 B2 * | 3/2004 | Tanaka | ................... | 152/209.14 |
| 6,712,133 B1 * | 3/2004 | Kyrtsos et al. | .............. | 165/239 |
| 7,075,421 B1 * | 7/2006 | Tuttle | ......................... | 340/449 |
| 7,350,408 B1 * | 4/2008 | Rogers et al. | ................. | 73/146 |
| 2001/0022802 A1 * | 9/2001 | Kurata | ......................... | 374/45 |
| 2003/0048178 A1 * | 3/2003 | Bonardi et al. | .............. | 340/442 |
| 2003/0140687 A1 | 7/2003 | Hottebart et al. | | |
| 2003/0144785 A1 * | 7/2003 | Brachert et al. | ................ | 701/74 |
| 2003/0220729 A1 * | 11/2003 | Doddek et al. | ................ | 701/50 |
| 2004/0130442 A1 * | 7/2004 | Breed et al. | ................. | 340/443 |
| 2006/0152352 A1 * | 7/2006 | Moughler | ................... | 340/438 |

FOREIGN PATENT DOCUMENTS

| | | |
|---|---|---|
| JP | 2003-159918 A | 6/2003 |
| JP | 2003-220810 A | 8/2003 |
| SU | 1762147 A1 * | 9/1992 |
| WO | WO 01/17806 A1 | 3/2001 |
| WO | WO 01/25034 A1 | 4/2001 |
| WO | 0207996 A1 | 1/2002 |

\* cited by examiner

METHOD DEVICE AND RECORDING MEDIUM WHERE PROGRAM IS RECORDED, FOR DECIDING RESIDUAL TRAVEL LIFE AND END OF LIFE OF RUN-FLAT TIRE THAT CONTINUES TRAVELING IN RUN-FLAT CONDITION

TECHNICAL FIELD

This invention relates to a process and an apparatus for judging a residual lifetime and an end stage of a run-flat tire during continuous running at a run-flat state as well as a record medium recording a program.

BACKGROUND ART

Recently, in terms of a safety operation of a pneumatic tire mounted on a vehicle, there are noticed vehicles each provided with a detection apparatus conducting a detection of a running state under abnormal service conditions such as lowering of a tire internal pressure, excess of a load or a running speed and the like so as to shorten the running lifetime of the tire, a detection of a running state predicting the occurrence of troubles such as burst and the like, and so on.

For example, the internal pressure monitoring apparatus monitors a tire internal pressure and calls attention to a driver by operating a warning or the like when the internal pressure lowers abnormally.

Also, as a technique for detecting an abnormal running condition in which the possibility of the occurrence of the trouble is high, WO 01/17806 A1 or the like discloses, for example, a technique of monitoring a tire temperature to judge the abnormality of the running condition when a rising ratio of the temperature or an absolute value of the temperature exceed a certain threshold value (WO 01/17806 or the like).

However, both of the above conventional detecting techniques judge whether the running condition including the tire internal pressure is merely abnormal or not, but do not quantitatively judge the abnormal degree (or a severity) of the running condition. To this end, the driver can know whether the running condition is abnormal or not at the judging time, but can not know the information on whether the continuous running at this running condition should quickly be stopped or whether the continuous running is enabled by the change of the running condition such as a deceleration or the like. Particularly, the driver can not know the information on a so-called residual lifetime of the tire that the remaining runnable distance is what kilometers if the continuous running is possible, or the information just before the tire trouble, that is, the information on a so-called end stage of the residual lifetime of the tire.

In especial, there are developed run-flat tires on the assumption that the tire can be continuously run over a certain distance even if the tire internal pressure (including that the tire internal pressure is zero (gauge pressure)) is abnormally lowered by the occurrence of puncture or the like to deform the tire into a run-flat state, for example, so-called core-type run-flat tires formed by inserting an internal support, so-called side-reinforced run-flat tires formed by arranging a reinforcing rubber on at least a sidewall portion at a side of an inner surface of the tire, so-called double run-flat tires formed by inserting another tire into an interior of the tire. In these tires, it is very important that the information on the residual lifetime and end stage of the run-flat tire during the continuous running at the run-flat state is quantitatively obtained in view of the safety operation.

DISCLOSURE OF THE INVENTION

It is, therefore, an object of the invention to provide a process, an apparatus and a program-recorded record medium capable of predicting runnable time and/or distance until the run-flat tire causes troubles when continuously running at the present run-flat running condition, or capable of judging a residual lifetime of the run-flat tire.

It is another object of the invention to provide a process, an apparatus and a program-recorded record medium capable of predicting a time just before the occurrence of troubles in the run-flat tire when continuously running at the run-flat state, or capable of judging an end stage of the residual lifetime of the run-flat tire.

In general, as the tire starts to run, the heat generation is caused by repetitive deformation of the tire during the running under loading to raise the temperature of the tire member.

As a process for measuring the temperature of the tire member, it is general to be a process in which a temperature sensor is arranged in a tire house opposite to a tread surface of the tire and detects a temperature of a tread surface of the tire as disclosed in JP-A-3-262715.

However, even when the temperature of the tire member is measured, the temperature-measured portion of the tire member is not necessarily troubled. Also, the tire surface temperature is easily subjected to an influence of external factors such as an outdoor air temperature and the like to cause a large error in the measured value of the tire surface temperature. Therefore, there is a case that the measured temperature is not necessarily coincident with the trouble as a relationship therebetween.

The inventors have noticed a vehicle provided with a detection apparatus for detecting abnormality of the tire, which has been recently developed at a high pitch in terms of attaching importance to the safety, and examined a relationship between an atmosphere temperature inside tire and troubles by adding a detection unit capable of measuring the atmosphere temperature inside tire to the above detection apparatus, and found that the very good relationship is obtained. And also, the measurement of the atmosphere temperature inside tire has advantages that the external factors such as an outdoor air temperature and the like are hardly affected as compared with the case of directly measuring the temperature of the tire member, the arrangement of the temperature sensor is easy, the measurement of the temperature is easy and the like. In addition, it can be advantageously applied even in a case that it is difficult to specify a portion being high in the possibility of the occurrence of the trouble.

Furthermore, it has been found that when a running time is t, the atmosphere temperature inside tire T is approximately expressed by an exponential function f(t) under the running condition that the internal pressure, load and running speed are constant, that is, $T=f(t)=T_0-A\exp(-BT)$ (wherein $T_0$ is a predicted saturation reaching temperature and A and B are coefficients).

Moreover, although the atmosphere temperature inside tire T can be approximated by the exponential function in relation to the running time t, if it reaches to a temperature causing the change of the properties in the rubber member constituting the tire, for example, a transition temperature as described later, it tends to shift from the prediction based on the exponential function. In this case, it is also found that it is good conformity to approximate by a linear function $T=f(t)=T_1+Ct$ (wherein $T_1$ is a measuring temperature and C is a change ratio of the measuring temperature per unit time).

Furthermore, it is found that the deformation quantity of the tire per unit time becomes large under abnormal use conditions such as lowering of the tire internal pressure, excess of the load or running speed and the like and hence the quantity of heat generation becomes large to raise the atmosphere temperature inside tire during the running, and troubles are caused when the atmosphere temperature inside tire reaches to a limit temperature being statistically the occurrence of the trouble, and the limit temperature is approximately constant irrespectively of the running conditions in the same kind of tires.

In addition, it is found that a sharp increase of the change ratio of the temperature calculated from the measured atmosphere temperature inside tire is recognized just before the occurrence of the trouble in the tire.

Therefore, the invention (first to sixth inventions) is accomplished on the basis of the above knowledge and the summary of the invention is as follows.

(1) A process for judging a residual lifetime of a run-flat tire during continuous running at a run-flat state in a vehicle equipped with a run-flat tire system comprising run-flat tires and detection units each arranged in the respective tire and capable of measuring a given temperature of the tire, characterized in that when at least one run-flat tire among the run-flat tires is continuously run at the run-flat state by an abnormal lowering of an internal pressure accompanied with the occurrence of puncture or the like, the given temperature of the run-flat tire continuously running at the run-flat state is measured, and a residual lifetime of the run-flat tire is judged based on the measured given temperature (First Invention).

(2) A process for judging a residual lifetime of a run-flat tire during continuous running at a run-flat state according to the item (1), wherein the residual lifetime is judged on the basis of the rising degree of the measured given temperature.

(3) A process for judging a residual lifetime of a run-flat tire during continuous running at a run-flat state according to the item (1), wherein the residual lifetime is judged by a runnable time and/or distance calculated on the basis of the measured given temperature until the trouble of the run-flat tire.

(4) A process for judging a residual lifetime of a run-flat tire during continuous running at a run-flat state according to the item (1), (2) or (3), wherein the given temperature of the tire is an atmosphere temperature inside tire.

(5) A process for judging a residual lifetime of a run-flat tire during continuous running at a run-flat state according to the item (4), wherein after the previous setting of a limit temperature being statistically the occurrence of the trouble when at least one run-flat tire among the run-flat tires is continuously run at the run-flat state by an extreme lowering of the internal pressure accompanied with the occurrence of puncture or the like, the atmosphere temperature inside tire is measured in the run-flat tire during the continuous running at the run-flat state, and a time predicted to reach to the limit temperature is calculated by using the measured values of the atmosphere temperature inside tire and data calculated from these measured values of the atmosphere temperature inside tire, and the calculated running time and/or running distance are rendered into a runnable time and/or distance up to the occurrence of troubles in the run-flat tire.

(6) A process for judging a residual lifetime of a run-flat tire during continuous running at a run-flat state according to the item (5), wherein after a relationship of an atmosphere temperature inside tire T to be measured with respect to a continuously running time t is previously determined as a function f(t) under various run-flat running conditions, when the run-flat tire is continuously run at the present run-flat running condition from a time point of measuring the atmosphere temperature inside tire, the running time and/or the running distance predicted to reach to the limit temperature are calculated by using the function f(t).

(7) A process for judging a residual lifetime of a run-flat tire during continuous running at a run-flat state according to the item (6), wherein the function f(t) is approximately expressed by $f(t)=T_0-A\exp(-Bt)$ (wherein $T_0$ is a predicted saturation reaching temperature and A and B are coefficients), and when the run-flat tire is continuously run at the present run-flat running condition from a time point of measuring the atmosphere temperature inside tire, the running time and/or the running distance predicted to reach to the limit temperature are calculated by using the function f(t).

(8) A process for judging a residual lifetime of a run-flat tire during continuous running at a run-flat state according to the item (7), wherein the coefficient B is a constant value, and the coefficient A and the predicted saturation reaching temperature $T_0$ are calculated from the measured temperature and a rate of temperature change thereof per unit time, and when the run-flat tire is continuously run at the present run-flat running condition from a time point of measuring the atmosphere temperature inside tire, the running time and/or the running distance predicted to reach to the limit temperature are calculated by using the function f(t) and substituting the calculated values therefor.

(9) A process for judging a residual lifetime of a run-flat tire during continuous running at a run-flat state according to the item (8), wherein the function f(t) differs bordering a transition temperature which is a given temperature lower than the limit temperature, and is approximately expressed by $f(t)=T_0-A\exp(-Bt)$ (wherein $T_0$ is a predicted saturation reaching temperature and A and B are coefficients) when the atmosphere temperature inside tire is a temperature region lower than the transition temperature, and a case that the predicted saturation reaching temperature $T_0$ is lower than the transition temperature is judged as a safety mode capable of continuously running at the run-flat state over a long time, and a case that the predicted saturation reaching temperature $T_0$ is higher than the transition temperature is judged as a danger mode of predicting the occurrence of trouble during continuous running at the run-flat state, and when the run-flat tire is continuously run at the present run-flat running condition from a time point of measuring the atmosphere temperature inside tire, the running time and/or the running distance predicted to reach to the limit temperature are calculated by using the function f(t).

(10) A process for judging a residual lifetime of a run-flat tire during continuous running at a run-flat state according to the item (9), wherein the function f(t) is approximately expressed by $f(t)=T_1+Ct$ (wherein $T_1$ is a measured temperature and C is a change ratio of temperature measured per unit time), and when the run-flat tire is continuously run at the present run-flat running condition from a time point of measuring the atmosphere temperature inside tire, the running time and/or the running distance predicted to reach to the limit temperature are calculated by using the function f(t).

(11) A process for judging a residual lifetime of a run-flat tire during continuous running at a run-flat state according to any one of the items (1)-(10), wherein the run-flat tire is a so-called side-reinforced run-flat tire in which a reinforcing rubber is arranged on at least a sidewall portion of the tire at an inner surface side thereof.

(12) A record medium recording a program for judging a residual lifetime of a run-flat tire during continuous running at a run-flat state, in which the program is recorded to conduct the process according to any one of the items (1)-(11) with a computer (Second Invention).

(13) An apparatus for judging a residual lifetime of a run-flat tire during continuous running at a run-flat state by conducting the process according to any one of the items (4)-(11), which comprises detection units arranged in the respective run-flat tires and capable of measuring at least an atmosphere temperature inside tire in these tires, calculation means for at least calculating a running time and/or a running distance predicted to reach to the limit temperature from the measured value of the atmosphere temperature inside tire when the run-flat tire is continuously run at the present run-flat running condition, and memory means for at least memorizing basic data to be compared with data calculated by the calculation means (Third Invention).

(14) A process for judging an end stage of a residual lifetime of a run-flat tire during continuous running at a run-flat state in a vehicle equipped with a run-flat tire system comprising run-flat tires and detection units each arranged in the respective tire and capable of measuring at least an atmosphere temperature inside tire, characterized in that when at least one run-flat tire among the run-flat tires is continuously run at the run-flat state by an abnormal lowering of an internal pressure accompanied with the occurrence of puncture or the like, the atmosphere temperature inside tire in the run-flat tire continuously running at the run-flat state is measured, and a ratio of temperature change at each measuring time is calculated, and a time point in which the calculated ratio of temperature change becomes higher than the ratio of temperature change calculated just before the calculation is judged as an end stage of the residual lifetime in the run-flat tire during continuous running at the run-flat state (Fourth Invention).

(15) A process for judging an end stage of a residual lifetime of a run-flat tire during continuous running at a run-flat state according to the item (14), wherein after a limit temperature being statistically the occurrence of trouble is previously set as a condition for judging the end stage of the residual lifetime of the run-flat tire, it is added that the atmosphere temperature inside tire in the run-flat tire reaches in the vicinity of the limit temperature.

(16) A process for judging an end stage of a residual lifetime of a run-flat tire during continuous running at a run-flat state according to the item (14) or (15), wherein as a condition for judging the end stage of the residual lifetime of the run-flat tire continuously running at the run-flat state, when the atmosphere temperature inside tire T to be measured is expressed by a function f(t) drawing a curve increased with a running continuous time t, it is added that a value of a second derivative f(t)" of the function f(t) is a positive value.

(17) A process for judging an end stage of a residual lifetime of a run-flat tire during continuous running at a run-flat state according to the item (14), (15) or (16), wherein the run-flat tire is a so-called side-reinforced run-flat tire in which a reinforcing rubber is arranged on at least a sidewall portion of the tire at an inner surface side thereof.

(18) A record medium recording a program for judging an end stage of a residual lifetime of a run-flat tire during continuous running at a run-flat state, in which the program is recorded to conduct the process according to any one of the items (14)-(17) with a computer (Fifth Invention).

(19) An apparatus for judging an end stage of a residual lifetime of a run-flat tire during continuous running at a run-flat state by conducting the process according to any one of the items (14)-(17), which comprises detection units each arranged in the respective tire and capable of measuring at least an atmosphere temperature inside tire, calculation means for at least calculating a ratio of temperature change from the measured value of the atmosphere temperature inside tire, and memory means for at least memorizing basic data to be compared with data calculated by the calculation means (Sixth Invention).

(20) An apparatus for judging an end stage of a residual lifetime of a run-flat tire during continuous running at a run-flat state according to the item (19), wherein the calculation means further calculates a value of the second derivative f(t)" in addition to the ratio of temperature change.

(21) An apparatus for judging an end stage of a residual lifetime of a run-flat tire during continuous running at a run-flat state according to the item (19) or (20), wherein the basic data memorized with the memory means is values of the already calculated ratio of temperature change and the second derivative f(t)" and/or the limit temperature.

BEST MODE FOR CARRYING OUT THE INVENTION

An embodiment of the invention will be described in detail with reference to the accompanying drawings below.

Figure 1:
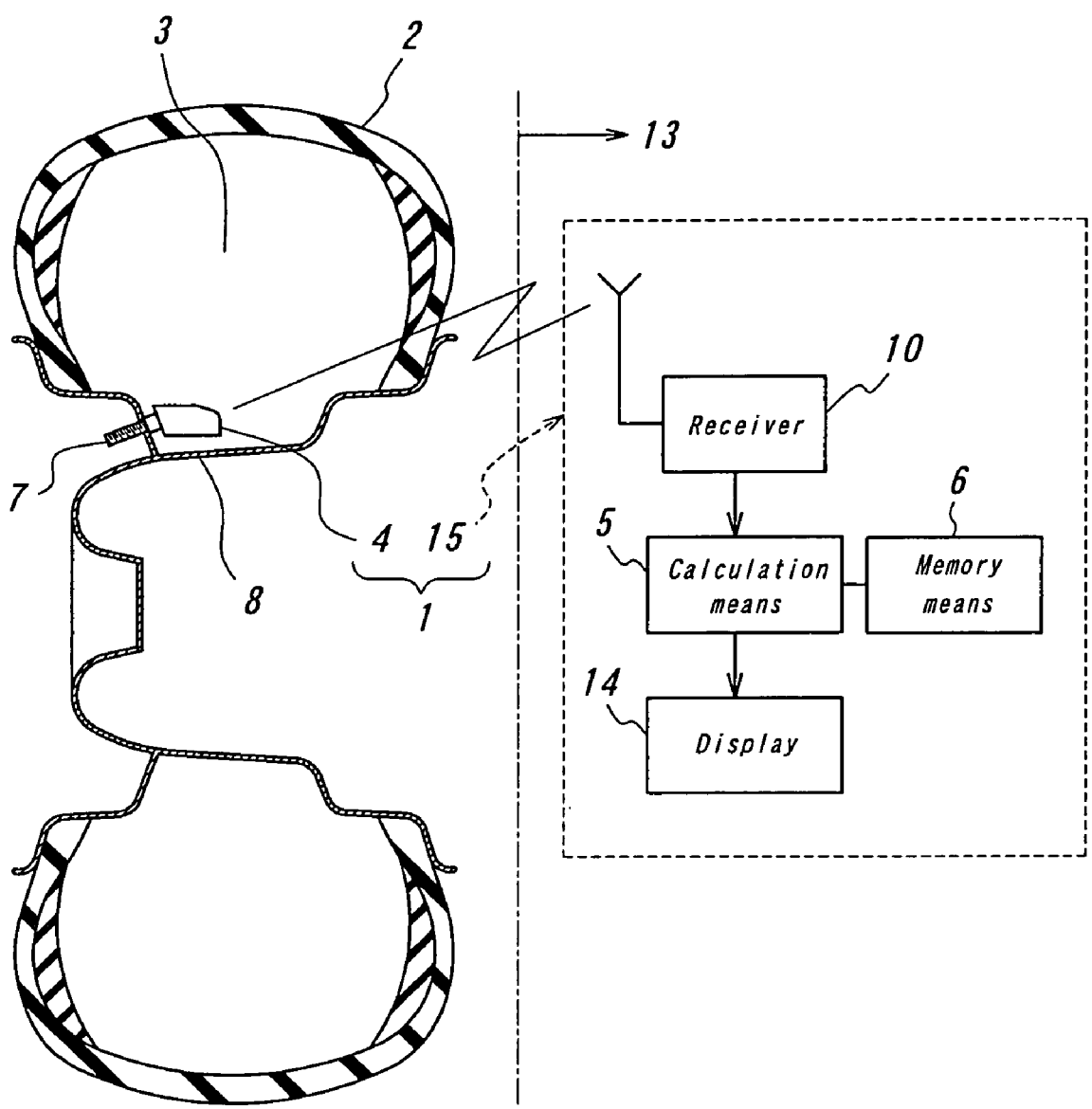
FIG. 1 is a schematic diagram showing an embodiment of the apparatus for judging a residual lifetime and an end stage of the run-flat tire according to the invention (Third and Sixth Inventions).

FIG. 1 shows an embodiment of the apparatus for judging a residual lifetime of a run-flat tire according to the invention (Third and Sixth Invention).

The judging apparatus 1 shown in FIG. 1 comprises a detection unit 4 capable of measuring a given temperature of a run-flat tire 2, preferably at least a temperature in an interior 3 of the tire, calculation means 5 at least calculating a running time and/or running distance predicted to reach to a limit temperature $T_L$ previously set as mentioned later from the measured value of the atmosphere temperature inside tire when continuously running at the present run-flat running condition, and memory means 6 at least memorizing a basic data for being compared with a data calculated with the calculation means 5.

Moreover, the term "run-flat tire" used herein includes not only a so-called side-reinforced run-flat tire in which a reinforcing rubber having a crescent-shaped section is arranged on at least a sidewall portion of the tire, but also a so-called core-type run-flat tire inserting a ring-shaped rigid body into a cavity defined by a tire and a wheel and a so-called tube-type run-flat tire further inserting a tire having a smaller diameter into the tire. And also, the term "given temperature of the tire" used herein includes a surface temperature of the tire and a temperature of the tire member in addition to the atmosphere temperature inside tire and also includes a temperature of a wheel and the like if the temperature of the tire can indirectly be comprehended.

Figure 2A:
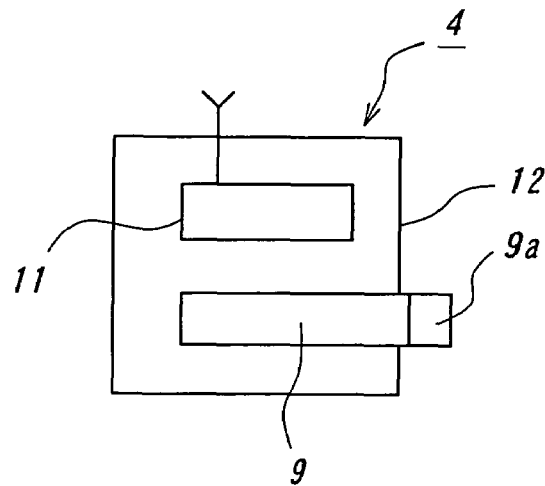
FIGS. 2A-2C are schematic diagrams illustrating various embodiments of the detection unit shown in FIG. 1, respectively.

The detection unit 4 is arranged in the tire 2 and may be integrally attached, for example, to a wheel 8 with a cylindrical valve stem 7 for pumping air in the tire 2 as shown in FIG. 1. An embodiment of the construction of the detection unit 4 is shown in FIG. 2A. The detection unit 4 shown in FIG. 2A is mainly constructed with a temperature sensor 9 measuring the temperature in the interior 3 of the tire, a signal conversion unit (not shown) for converting data detected by the temperature sensor 9 into digital signals, a radio transmitter 11 for transmitting the converted signal data to a receiver 10 (FIG. 1) located at a side of a vehicle body, and a casing 12 for hermetically accommodating the temperature sensor 9 and the transmitter 11 together. By the detection unit 4 can be accurately measured an atmosphere temperature inside tire 2. Moreover, it is preferable that the temperature sensor 9 is constituted so that only a temperature-sensing portion 9a is not accommodated in the casing 12 and is exposed in the interior 3 of the tire 2 so as to directly contact the temperature-sensing portion 9a with an atmosphere in the interior 3.

Figure 2B:
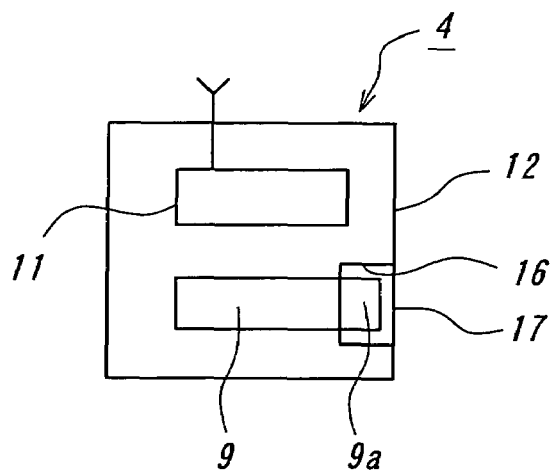
Figure 2C:
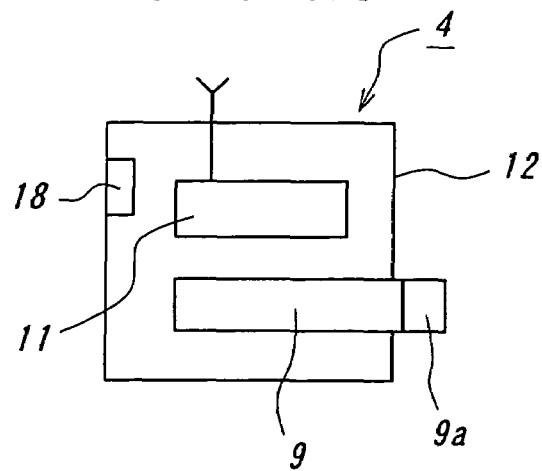

And also, FIGS. 2B and 2C show another embodiments of the detection unit 4, in which the same members as in the embodiment of FIG. 2A are designated by the same reference symbols and the explanation thereof is omitted.

The embodiment shown in FIG. 2B is different from the embodiment shown in FIG. 2A in an arrangement of the temperature-sensing portion 9a. That is, in the embodiment shown in FIG. 2B, a part of the casing 12 is dented to form a receiving portion 16 directly communicating with an outside atmosphere and the temperature-sensing portion 9a is arranged in the receiving portion 16. Also, an opening of the receiving portion 16 is covered by a casing 17 separated from the casing 12 so as to cover the temperature-sensing portion 9a. The casing 17 is constituted by forming a plurality of small apertures or with a wire mesh so that the atmosphere can pass therethrough, whereby the atmosphere in the tire 2 is directly contacted with the temperature-sensing portion 9a. In the embodiment shown in FIG. 2B, the temperature-sensing portion 9a can be protected in the atmosphere inside the tire 2 from an accident such as collision with a foreign material or the like.

The embodiment shown in FIG. 2C is different from the embodiment shown in FIG. 2A in a point that the casing 12 is provided with an external sensor input circuit 18. The external sensor input circuit 18 is connected to the transmitter 11 and constituted so as to transmit data downloaded by an external sensor connected to the external sensor input circuit 18 to the receiver 10 located at the vehicle body side. Although one external sensor input circuit 18 is shown in this embodiment, the number of the circuits can be naturally increased, if necessary. Also, the connection between the external sensor and the external sensor input circuit 18 can be conducted by the conventionally known means such as a connector not shown or the like.

In the embodiment shown in FIG. 2C, when a temperature sensor(s) 9 is arranged in another place(s) in the tire 2 as an external sensor, temperature data obtained through the external sensor input circuit 18 can be transmitted from the detection unit 4 to the receiver 10 located at the vehicle body side for utilizing in the calculation through the calculation means 5. In case of providing the plural temperature sensors as another external sensor, the accuracy in various predictions and judgments can be further improved by carrying out the calculation based on the temperature data in plural places. Also, when an acceleration sensor(s) is arranged in another place(s) in the tire as an external sensor, acceleration data obtained through the external sensor input circuit can be transmitted from the detection unit 4 to the receiver 10 located at the vehicle body side for utilizing in the calculation through the calculation means 5. In case of providing the plural acceleration sensors as another external sensor, the calculation can be carried out by adding the acceleration data and hence the accuracy in various predictions and judgments can be further improved likewise the above.

Figure 7:
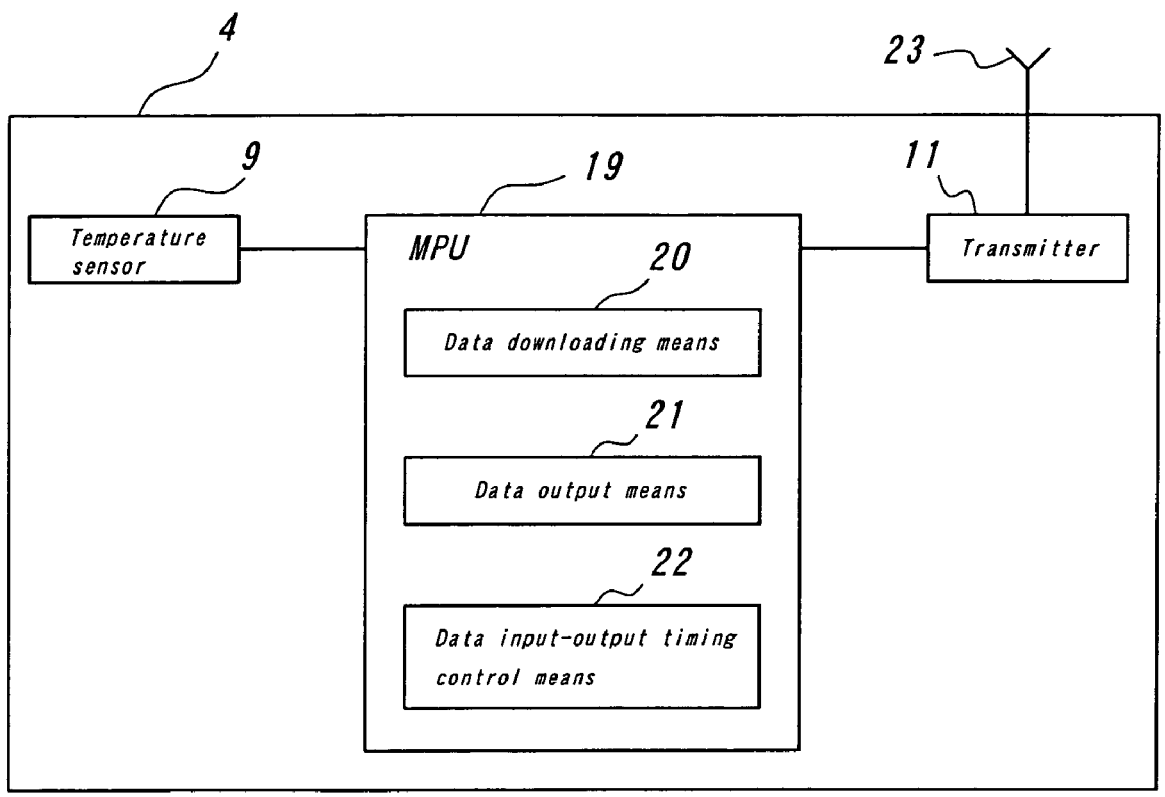
FIG. 7 is a block diagram showing a construction of a detection unit used in the apparatus of the invention.

FIG. 7 is a block diagram showing a construction of the detection unit 4. The detection unit 4 is constructed with a temperature sensor 9 for measuring a temperature inside tire, a MPU 19 constituting a control unit and a transmitter 11 for transmitting the temperature data. The MPU 19 comprises data downloading means 20 for downloading data measured by the temperature sensor 9 at a given download cycle, data output means 21 for outputting the data at a given output cycle to the transmitter 11, and data input-output timing control means 22 for controlling the output timing. And also, the transmitter 11 is provided with a transmitting antenna 23 for transmitting the data.

Figure 8:
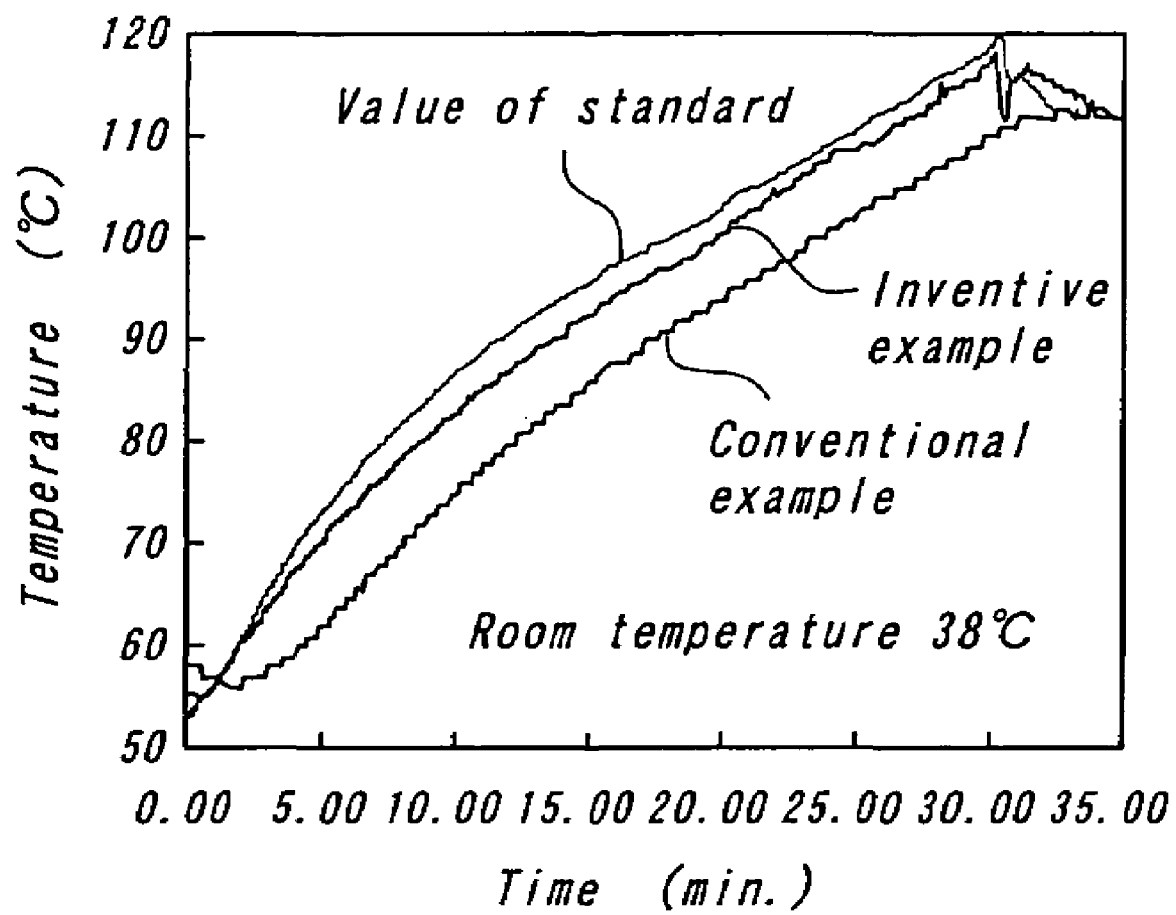
FIG. 8 is a graph when comparing an output from a temperature sensor during an actual running with a relationship between time and temperature.

FIG. 8 is a graph comparing the output from the temperature sensor during an actual running with a relationship between the time and the temperature. In FIG. 8 are shown the data of reference measured by the temperature sensor inside the tire 2 by using a slip ring as a standard value, the data measured by the detection unit 4 as an inventive example and the data measured by the conventional detection unit as a conventional example. As seen from FIG. 8, the inventive example is close to the standard value over all regions as compared with the conventional example and hence the inventive example can measure an accurate temperature as compared with the conventional example.

Moreover, it is preferable to use, for example, a resistance thermometer (thermistor), a thermoelectric couple or the like as the temperature sensor 9.

Although the detection unit 4 of FIG. 1 shows a construction conducting only a measurement of temperature, it may incorporate, for example, a construction for measuring the internal pressure. In the latter case, the signal conversion unit, the transmitter and the like can be used at the same time.

In the invention is shown a case that the tire temperature is indirectly measured by measuring only an atmosphere temperature inside tire. However, the temperature of the tire member can be directly measured in addition to the atmosphere temperature inside tire. In the latter case, it is possible to more accurately calculate the data.

In case of measuring the temperature of the tire member, it is preferable to measure a temperature of a site of the tire member that is high in the possibility of causing trouble, such as an end portion of a belt, a side-reinforcing rubber in the side-reinforced run-flat tire or the like. Moreover, the decision of the site having a high possibility of causing the trouble can be carried out by a test for setting the limit temperature.

In FIG. 1, the judging apparatus 1 comprises a receiver unit 15 for receiving and processing the data transmitted from the detection unit 4 at an outer side of the tire, more concretely, at the vehicle body side 13 in addition to the detection unit 4.

The receiver unit 15 comprises a receiver 10 for receiving the data transmitted from the detection unit 4, calculation means 5 for calculating various data by using the measured value of the atmosphere temperature inside tire received with the receiver 10, and memory means 6 for memorizing basic data and the like to be compared with the data calculated by the calculation means 5, which is arranged at the outer side of the tire, more concretely, at the vehicle body side 13. Further, a display 14 for displaying the results calculated by the calculation means 5 is arranged in FIG. 1.

The receiver unit 15 may be arranged inside a wheel by integrally uniting with the detection unit 4 in a common casing. In this case, the receiver units 15 is arranged in correspondence with the detection units 4 arranged in the respective wheel. On the other hand, when the receiver unit 15 is arranged at the side of the vehicle body 13 separately from the detection unit 4, it is possible to conduct the calculation processing of the data from the detecting unit 4 arranged in each of the wheels with a single receiver unit 15.

In the memory means 6 is memorized the basis data to be compared with the data calculated by the calculation means 5. Further, the limit temperature, the transition temperature, the coefficient B of the exponential function f(t) as mentioned later and the like may be memorized, if necessary.

And also, the change ratio of the measured temperature per unit time and the calculated value of the second derivative f(t)″ or the like obtained by differentiating the exponential function f(t) as mentioned later twice may be memorized.

Furthermore, when a computer is used as the calculation means 5, it can house the memory means 6.

Therefore, the judging apparatus 1 according to the invention can judge the residual lifetime and the end stage of the run-flat tire during continuous running at the run-flat state by adopting the above construction.

Next, the details in which the invention has been accomplished are explained in detail together with the description of the action. Moreover, they are explained by using results tested with the side-reinforced run-flat tire.

Figure 3:
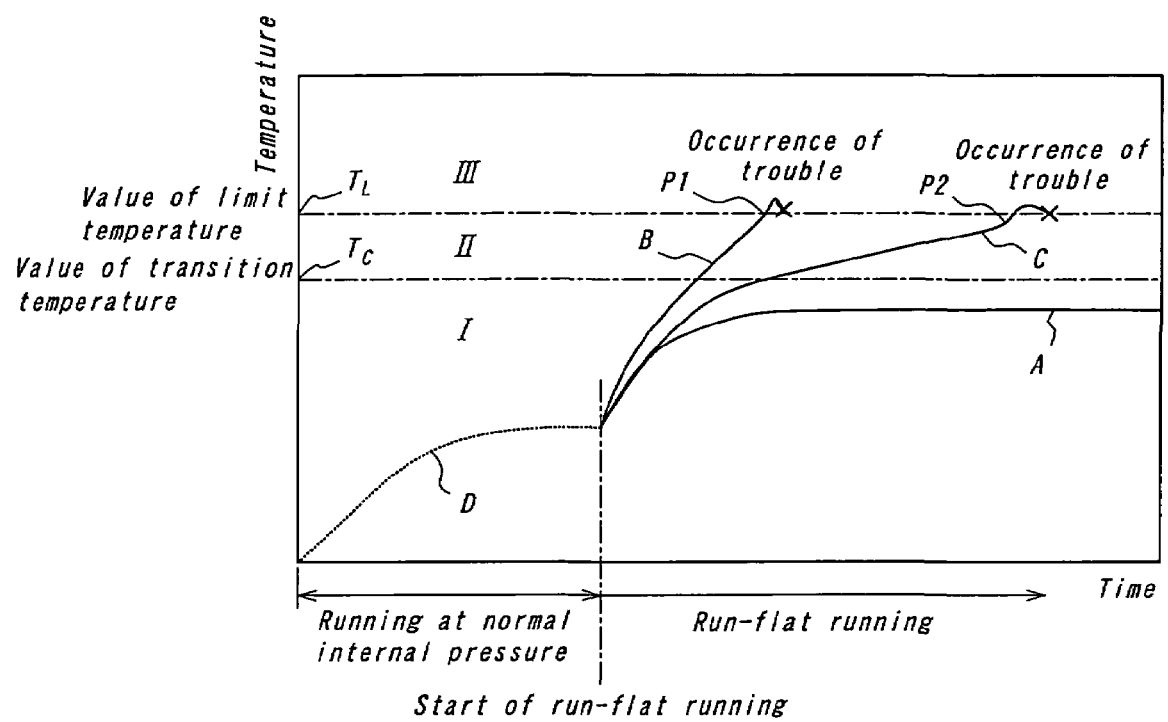
FIG. 3 is a graph inclinationally showing a transition of an atmosphere temperature inside tire when continuously running at various running conditions.

FIG. 3 inclinationally shows a relationship between the measured value of the atmosphere temperature inside tire and the running time when the tire is run under various running conditions.

First, when the tire subjected to a normal internal pressure and a normal load is started to run at a usual (normal) state, the atmosphere temperature inside tire measured rises according to approximately an exponential function (T=$T_0$'−A'exp(−B't)) with the running time t (see a curve D drawn by a broken line in FIG. 3), but the atmosphere temperature inside tire is constantly saturated at a temperature lower than the limit temperature being statistically the occurrence of trouble and there is no temperature rise, so that the trouble of the tire is not caused even in the running over a long time.

Next, as a run-flat running starts on the way of the normal running, the atmosphere temperature inside tire further rises. In this case, it is found that the atmosphere temperature inside tire measured rises according to approximately an exponential function (T=$T_0$−Aexp(−Bt)) with the running time t from the start of the run-flat running. And also, it is found out that the atmosphere temperature inside tire is expressed by different curves of the exponential function in accordance with a case that the predicted saturation reaching temperature $T_0$ is existent within either of three temperature regions I-III.

That is, a curve A shown in FIG. 3 is a case that conditions of the tire internal pressure, running speed and the load are not so severe and the predicted saturation reaching temperature $T_0$ is existent within the temperature region I lower than both temperatures of the limit temperature and the transition temperature as mentioned later being a specific temperature lower than the limit temperature. When the running condition corresponds to this case, even if the running is continued over a long time, there is caused no tire trouble.

And also, a curve B is a case that conditions of the tire internal pressure, running speed and the load are very severe and the predicted saturation reaching temperature $T_0$ is existent within the temperature region III higher than the limit temperature. When the running condition corresponds to this case, the tire trouble is caused in a short-time continuous running.

Furthermore, a curve C is a case that conditions of the tire internal pressure, running speed and the load are severer than those of the curve A but milder than those of the curve B and the predicted saturation reaching temperature $T_0$ is existent within the temperature region II between the limit temperature and the transition temperature. In this case, as the atmosphere temperature inside tire measured rises over the transition temperature, the repeated deformation quantity of the tire is particularly increased by the lowering of the elastic modulus of the side-reinforcing rubber to increase the amount of heat generation, so that the atmosphere temperature inside tire is further raised without being saturated at the predicted saturation reaching temperature $T_0$ and finally arrives at the limit temperature, so that the tire finally tends to result in developing trouble.

Therefore, the process for judging the residual lifetime of the tire according to the first invention has been accomplished on the basis of the above results and concretely lies in that when at least one run-flat tire 2 among the run-flat tires is continuously run at the run-flat state by an extreme lowering of an internal pressure accompanied with the occurrence of puncture or the like, after a limit temperature being statistically the occurrence of trouble is previously set, the atmosphere temperature inside tire in the run-flat tire 2 continuously running at the run-flat state is measured, and a time predicted to reach to the limit temperature is calculated by using the measured values of the atmosphere temperature inside tire and data calculated from these measured values of the atmosphere temperature inside tire, and the calculated running time and/or running distance are rendered into a runnable time $t_e$ and/or distance $d_e$ until the run-flat tire results in developing trouble.

The limit temperature $T_L$ can be set by conducting an indoor drum test under running conditions of, for example, low internal pressure, an overload and a high speed to measure a temperature transition until the occurrence of troubles. The measurement of the temperature is preferable to be carried out under the same conditions as in the actual application of the process and apparatus of the invention (a measuring position of the atmosphere temperature inside tire, a temperature sensor used in the measurement and the like). Moreover, the limit temperature can be set at a numerical value lower than the value determined by the test for the safety. And also, the measurement of the atmosphere temperature inside tire in the running tire is preferable to be carried out under the same condition as in the test for setting the limit temperature. Since a target of evaluation in the invention is especially a state of change of the atmosphere temperature inside tire, the temperature detection unit 4 is preferable to use the temperature sensor 9 having a small heat capacity. The temperature sensor 9 is preferable to be arranged at such a position in the tire that does not obstruct heat conduction between the temperature-sensing portion 9a and the atmosphere inside tire (air) to be measured.

Moreover, it is preferable that after a relationship of the atmosphere temperature inside tire T to be measured with respect to a continuously running time t is previously determined as a function f(t) under various run-flat running conditions, when the run-flat tire is continuously run at the present run-flat running condition from a time point of measuring the atmosphere temperature inside tire, the running time and/or the running distance predicted to reach to the limit temperature are calculated by using the function f(t), and the calculated running time and/or running distance are rendered into a runnable time and/or distance until the occurrence of trouble.

Also, although the function f(t) can use a quadratic expression or a polynomial expression of a high order more than the quadratic expression in accordance with the required predictive accuracy and the actual temperature transition obtained by the test for the limit temperature or the like, it is basically preferable to be approximately expressed by an exponential function $f(t)=T_0-A\exp(-Bt)$ (wherein $T_0$ is a predicted saturation reaching temperature and A and B are coefficients).

Moreover, the coefficient B in the function f(t) is a coefficient relating to heat conduction between the tire and the outdoor air and can be regarded as a constant value (preferably, a range of 0.10-0.13), so that it can be previously set as a constant. Also, the value of the coefficient B may be determined from the measured values of the atmosphere temperature inside tire in plural time points under a constant running condition.

If the coefficient B is a constant value, the coefficient A and the predicted saturation reaching temperature $T_0$ can be calculated from a present measuring temperature and a change ratio thereof per unit time. By using the function f(t) and substituting their calculated values therefor can be calculated a runnable time predicted to reach to the limit temperature $T_L$ when the tire is continuously run at the present run-flat running condition from the time point of measuring the atmosphere temperature inside tire with respect to the respective running conditions.

In addition, the running distance predicted to reach to the limit temperature $T_L$ can be determined as product of the present running speed and the calculated runnable time.

Moreover, in order to remove a variable component of the measured temperature resulted from noise, it is preferable to conduct, for example, the elimination of a high-frequency component through a filter, the smoothing based on the calculation of the moving average within a constant time or the like.

Furthermore, the function f(t) tends to differ bordering a transition temperature $T_C$ which is a given temperature lower than the limit temperature as previously mentioned.

To this end, when the atmosphere temperature inside tire is existent in a temperature region lower than the transition temperature, the function f(t) is approximately expressed by $f(t)=T_0-A\exp(-Bt)$ (wherein $T_0$ is a predicted saturation reaching temperature and A and B are coefficients), in which a case that the predicted saturation reaching temperature $T_0$ is lower than the transition temperature $T_C$ is judged as a safety mode capable of continuously running at the run-flat state over a long time, and a case that the predicted saturation reaching temperature $T_0$ is higher than the transition temperature is judged as a danger mode of predicting the occurrence of trouble during continuous running at the run-flat state, and when the tire is continuously run at the present run-flat running condition from a time point of measuring the atmosphere temperature inside tire, the running time and/or the running distance predicted to reach to the limit temperature can be calculated by using the function f(t).

Figure 4:
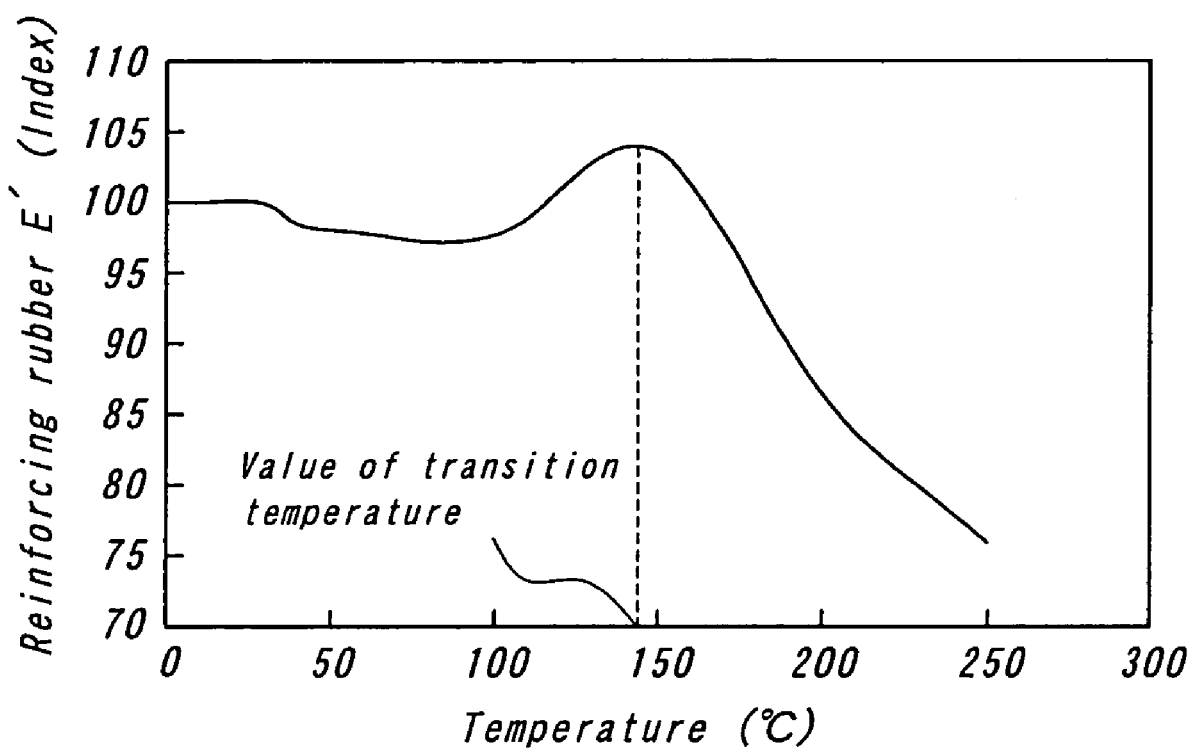
FIG. 4 is a graph showing an embodiment when transition temperature is set by a temperature change in a modulus of elasticity of a reinforcing rubber.

The transition temperature $T_C$ is rendered into a temperature at a time point that the temperature transition measured by, for example, the test for setting the limit temperature $T_L$ is out of the exponential function $f(t)=T_0-A\exp(-Bt)$, or may be set from a temperature dependency of properties in a rubber member if rubber members causing the trouble can be specified. In the latter case, it is necessary to consider a bias between the atmosphere temperature inside tire and the temperature of the rubber member. For example, as the rubber member causing trouble is a side-reinforcing rubber in case of the side-reinforced run-flat tire, and in this case, as shown in FIG. 4, the transition temperature can be set from the temperature dependency of the elastic modulus E' in the side-reinforcing rubber.

And also, when the atmosphere temperature inside tire is existent within a temperature region higher than the transition temperature $T_C$, the function f(t) is approximately expressed by $f(t)=T_1+Ct$ (wherein $T_1$ is a measured temperature and C is a change ratio of temperature measured per unit time). When the tire is continuously run at the present run-flat running condition from a time point of measuring the atmosphere temperature inside tire, the running time and/or the running distance predicted to reach to the limit temperature $T_L$ can be calculated by using the function f(t).

In this case, the change ratio of temperature measured per unit time, that is, a temperature change ratio T' may use an average change ratio per unit time determined from, for example, the measured values of the temperature obtained within a constant time.

Figure 5:
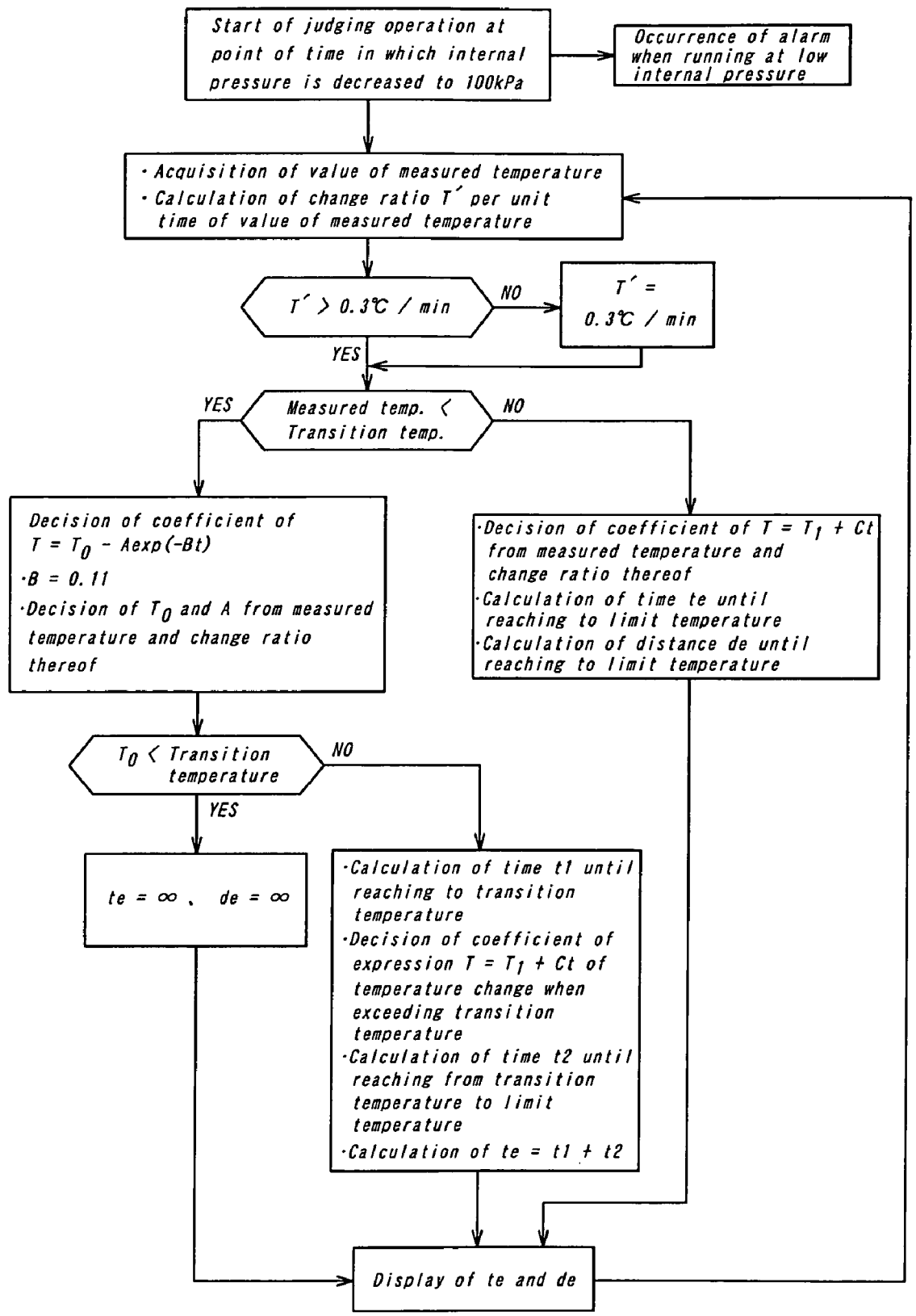
FIG. 5 is a flow chart showing an embodiment of the process for judging a residual lifetime of a run-flat tire during continuous running at the run-flat state.

FIG. 5 shows an embodiment of the process for judging a residual lifetime of a run-flat tire during continuous running at a run-flat state as a flow chart.

In FIG. 5, means for detecting an internal pressure is disposed in the detection unit 4 for always monitoring the internal pressure, and a judging operation (judgment of a residual lifetime during running) is started at a point of time that the internal pressure lowers to, for example, 100 kPa. In this case, an alarm on the running under a low internal pressure may be raised.

After the start of the judging operation, there are conducted the measurement of the atmosphere temperature inside tire and the calculation of the change ratio T' per unit time (temperature change ratio). And, whether or not the temperature change ratio T' is larger than a standard temperature change ratio, for example, 0.3° C./min is judged in which in case of not larger than 0.3° C./min, the temperature change ratio is regarded as 0.3° C./min, while in case of larger than 0.3° C./min, the temperature change ratio T' is made a measured value of the temperature change ratio.

Next, there is judged whether or not the atmosphere temperature inside tire measured is lower than the transition temperature $T_C$.

When the atmosphere temperature inside tire measured T is lower than the transition temperature $T_C$, the predicted saturation reaching temperature $T_0$ and the coefficient A are determined by using $T=T_0-A\exp(-Bt)$ as a relational expression between the atmosphere temperature inside tire T and the continuous running time t and rendering the coefficient B into a constant value, for example, 0.11. When the predicted saturation reaching temperature $T_0$ is lower than the transition temperature $T_C$, even if the tire is continuously run at the present run-flat running condition from a time point of measuring the atmosphere temperature inside tire, the atmosphere temperature T does not reach to the limit temperature $T_L$ and the trouble does not occur, so that the runnable time $t_e$ and the runnable distance $d_e$ predicted to reach to the limit temperature $T_L$ are indicated in a display 14 such as a display panel in the vehicle as an infinity.

When the predicted saturation reaching temperature $T_0$ is not lower than the transition temperature $T_C$, during the continuous running at the present run-flat running condition from a time point of measuring the atmosphere temperature inside tire, a time t1 until the atmosphere temperature inside tire reaches to the transition temperature $T_C$ is calculated and the temperature change ratio C on and after the transition temperature $T_C$ is determined from $T=T_1+Ct$ to calculate a time t2 until the atmosphere temperature inside tire reaches from the transition temperature $T_C$ to the limit temperature $T_L$, from which a runnable time $t_e$ is made t1+t2 and a runnable distance $d_e$ is calculated from product of the runnable time and the running speed, and they are indicated in the display 14.

On the other hand, when the atmosphere temperature inside tire measured T is not lower than the transition temperature $T_C$, the temperature change ratio C is determined from the atmosphere temperature inside tire measured by using $T=T_1-Ct$ as a relational expression between the atmosphere temperature inside tire T and the continuous running time t, from which a runnable time $t_e$ and a runnable distance $d_e$ until the atmosphere temperature inside tire reaches to the limit temperature $T_L$ are calculated to indicate in the display 14.

After the runnable time $t_e$ and the runnable distance $d_e$ are indicated in the display 14, the measurement of the atmosphere temperature inside tire and the calculation of the temperature change ratio T' are conducted continuously or at a given time interval to repeat a series of steps as mentioned above.

Thus, when the running time $t_e$ and/or the running distance $d_e$ predicted to reach to the limit temperature are informed to a driver during the continuous running at the present run-flat running condition, the driver can quantitatively comprehend the severity of the present running state and hence adopt a suitable action such as deceleration or the like.

Also, in order to attain the facility of comprehending the running state and the concretization of the action to be adopted by the driver, step-by-step alarm may be given in accordance with the predicted time or distance. For example, when the predicted runnable time is less than 30 minutes, an alarm A for prompting the urgent deceleration and stop is given, while when the predicted runnable time is not less than 30 minutes and the predicted saturation reaching temperature $T_0$ is not lower than the limit temperature, an alarm B for prompting the declaration is given.

Furthermore, when the predicted saturation reaching temperature $T_0$ is lower than the transition temperature $T_C$, the runnable time $t_e$ and the runnable distance $d_e$ are indicated as an infinity. However, this indication is not clear to mean whether or not the present running condition is a normal running condition or whether the internal pressure, the load and the like are abnormal running conditions but are runnable conditions. Therefore, when it is required to clearly distinguish them, it is more preferable to further add a construction for giving an alarm, for example, by considering the evaluation of absolute value of the temperature measured, a value of an internal pressure detected by the internal pressure alarm machine and the like.

Concretely, it is considered that an alarm C is given when the atmosphere temperature inside tire measured is a value that can not reach under the normal running condition or the value of the internal pressure detected is less than 100 kPa and the predicted saturation reaching temperature $T_0$ is lower than the limit temperature $T_L$.

Moreover, when the atmosphere temperature inside tire measured is lowered by the action of the driver or when the temperature change ratio T' per unit time is negative, the predicted saturation reaching temperature $T_0$ becomes lower than the limit temperature $T_L$, but this case is preferable to have a construction according to the above. Concretely, after the start of the judging operation, the measurement of the atmosphere temperature inside tire and the calculation of the ratio T' changed per unit time (temperature change ratio) are conducted, and if the temperature change ratio T' is more negative than the temperature change ratio being a standard value, it is desirable to continuously call the driver's attention while such a temperature change ratio is regarded as a standard value.

Although the above is on the assumption that the driver takes actions, it can be applied to the direct control of the vehicle, for example, by operating a speed limiter, an output limiter, or the like in accordance with the predicted runnable time te or distance de.

As a starting period of the judging operation, there are mentioned a time point that the internal pressure lowers to a certain vale as previously mentioned, a time point of starting the running of the vehicle, a time point of raising the atmosphere temperature inside tire measured up to a constant value, and the like.

A record medium recording a program for judging a residual lifetime of a run-flat tire according to the second invention is a record medium recording a program for carrying out the above-mentioned process with a computer.

The process for judging an end stage of a residual lifetime according to the fourth invention lies in that in a vehicle equipped with a run-flat tire system comprising run-flat tires 2 and detection units 4 each arranged in the respective tire 2 and capable of measuring at least an atmosphere temperature inside tire, when at least one run-flat tire 2 among the run-flat tires is continuously run at the run-flat state by an abnormal lowering of an internal pressure accompanied with the occurrence of puncture or the like, the atmosphere temperature inside tire in the run-flat tire 2 continuously running at the run-flat state is measured, and a ratio of temperature change T' at each measuring time is calculated, and a time point in which the calculated ratio of temperature change becomes higher than the ratio of temperature change calculated just before the calculation is judged as an end stage of the residual lifetime in the run-flat tire 2 during continuous running at the run-flat state.

Furthermore, as a condition for judging the end stage of the residual lifetime of the run-flat tire 2, after the limit temperature $T_L$ is previously set, it is preferable to add a feature that the atmosphere temperature inside tire in the run-flat tire 2 reaches in the vicinity of the limit temperature $T_L$.

As a condition for judging the end stage of the residual lifetime of the run-flat tire 2 continuously running at the run-flat state, it is also preferable to add a feature that when the atmosphere temperature inside tire measured T is expressed by a function f(t) drawing a curve increased with the running continuous time t, a value of a second derivative f(t)″ of the function f(t) is a positive value.

It has been found that just before the tire running at the run-flat state develops trouble, there is a tendency that as shown in the curves B and C of FIG. 3, inflection points P1 and P2 changing from an upward convex shape to a downward convex shape are existent on the graph of the function f(t). Therefore, if a time point of changing the value of the second derivative f(t)″ of the function f(t) a negative value to a positive value, that is, a time point of producing the inflection points P1 and P2 is judged as the end stage of the residual lifetime of the tire, the driver can take a proper action just before the occurrence of trouble.

Moreover, the value of the second derivative f(t)″ (=T″) of the measured temperature used in the judgment of the end stage of the residual lifetime can be determined by further differentiating the change ratio of the measured temperature per unit time T' (temperature change ratio) obtained within a constant period.

Figure 6:
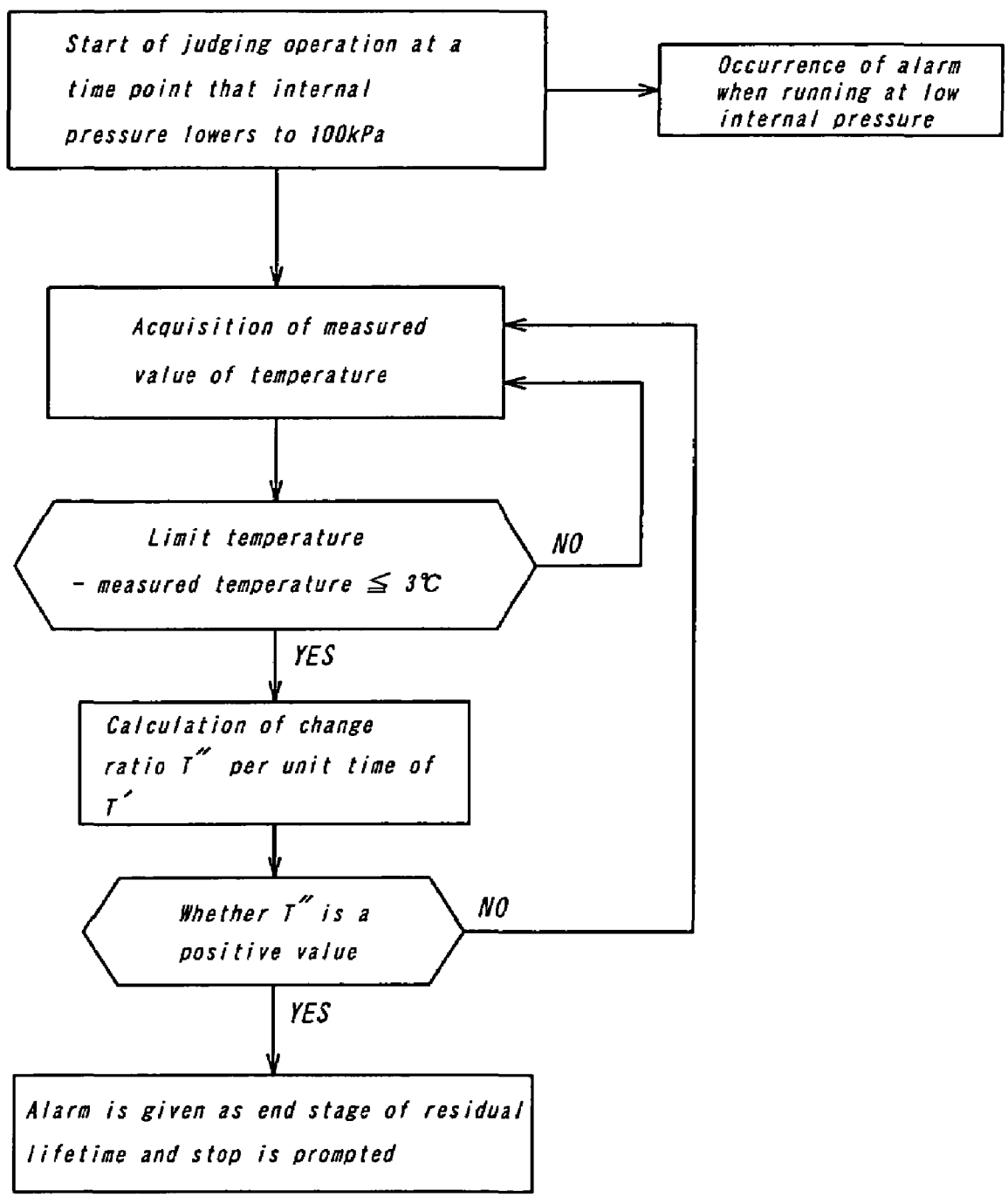
FIG. 6 is a flow chart showing an embodiment of the process for judging an end stage of a residual lifetime of a run-flat tire during continuous running at the run-flat state.

FIG. 6 shows an embodiment of the process for judging the end stage of the residual lifetime of the run-flat tire 2 during continuous running at the run-flat state as a flow chart.

In FIG. 6, means for detecting an internal pressure is disposed, for example, in the detection unit 4 to constantly monitor the internal pressure, and the predicting operation (judgement of the residual lifetime during running) is started at a time point that the internal pressure lowers to, for example, 100 kPa. In this case, an alarm of running under a low internal pressure may be given.

After the start of the judging operation, the atmosphere temperature inside tire is measured to judge whether or not a difference between the atmosphere temperature inside tire measured and the limit temperature $T_L$ is not more than a constant value (not more than 3° C. in FIG. 3), and the measurement of the atmosphere temperature inside tire is repeated until the measured value becomes not more than the constant value, and at a time point that the measured value becomes the constant value, a change ratio per unit time T' (temperature change ratio) is first calculated from the measured value of the atmosphere temperature inside tire and further a change ratio T" per unit time of the temperature change ratio T' is calculated.

By judging a time point of changing the change ratio T" from a negative value-to a positive value as an end stage of the residual lifetime of the tire is given an alarm to the driver.

Thus, the process for judging the end stage of the residual lifetime of the tire according to the fourth invention can be accurately given the end stage of the residual lifetime, more strictly, the time point just before the trouble of the tire to the driver, so that the driver can take an urgent action before the occurrence of trouble.

Although the above is on the assumption that the driver takes actions, it can be applied to the direct control of the vehicle by operating a speed limiter, an output limiter, or the like, for example, at a time point of judging the predicted end stage of the residual lifetime.

As a starting period of the judging operation, there are mentioned a time point that the internal pressure lowers to a certain vale as previously mentioned, a time point of starting the running of the vehicle, a time point of raising the atmosphere temperature inside tire measured up to a constant value, and the like.

A record medium recording a program for judging a residual lifetime of a run-flat tire according to the fifth invention is a record medium recording a program for carrying out the above-mentioned process with a computer.

Although the above is described with respect to only preferred embodiments of the invention, various modifications may be taken within a scope of the invention.

EXAMPLES

An apparatus capable of judging both the residual lifetime and the end stage thereof according to the inventive tire is applied to a vehicle equipped with a run-flat tire system comprising side-reinforced run-flat tires (tire size: 245/40ZR18) and detection units each arranged in the respective tire and capable of measuring an atmosphere temperature inside tire and an internal pressure thereof and the judgement is actually carried out by the apparatus, which is explained below.

The detection unit arranged at a wheel side comprises a temperature detecting means including a temperature sensor, an internal pressure detecting means, a signal converting means common to these detecting means and a transmitter. A resistance thermometer is used as the temperature sensor, and the atmosphere temperature inside tire is measured by arranging a temperature-sensing portion of the temperature sensor so as to expose in the interior of the tire. The arranging position of the detection unit is a position of a valve on a rim.

And also, the receiver unit arranged at the vehicle body side comprises a display 14 indicating calculation results in addition to a receiver, a calculation means and a memory means. Moreover, the limit temperature, the transition temperature and the coefficient B (B=0.11) of the exponential function f(t) are memorized in the memory means.

The setting of the limit temperature and the transition temperature is carried out by changing running conditions (tire internal pressure, load and running (rotating) speed) in an indoor drum test and measuring the transition of the atmosphere temperature inside tire until the occurrence of trouble in the tire. From these running test results, the limit temperature is set at 103° C. and the transition temperature is set at 90° C. The atmosphere temperature inside tire is measured at an interval of 10 seconds. The change ratio T' per unit time of the atmosphere temperature inside tire measured and the change ratio T" per unit time of the change ratio T' are calculated by using data obtained for the past 3 minutes. Also, the data obtained by a speedometer of the vehicle or values calculated from a centrifugal force measured by an accelerometer mounted on the wheel are used as a speed data required for calculating the distance. A series of steps for judging the residual lifetime of the tire and the end stage thereof are carried out by the same steps as those of FIGS. 5 and 6, respectively.

(1) Test Result 1 (Results of Judging the Residual Lifetime of the Tire)

In the run-flat running of the vehicle equipped with the judging apparatus, as the running is further continued at a running condition judged that the runnable time until the occurrence of trouble is 60 minutes, vibrations are generated from the tire after about 65 minutes and the continuous running is impossible. At this time, the atmosphere temperature inside tire is 103° C. Thereafter, as the troubled tire is cut to examine a trouble site, it has been confirmed that the side-reinforcing rubber is a trouble site because cracks are generated in the side-reinforcing rubber.

And also, when the running is continued under running conditions that the predicted saturation reaching temperature $T_0$ is lower than the transition temperature and the time predicted to reach to the limit temperature becomes an infinity, there is caused no trouble even after the running of about 280 km.

Furthermore, when the running is continued by decelerating from such a running condition that the time predicted to reach to the limit temperature is 30 minutes to such a running condition that the time predicted to reach to the limit temperature becomes an infinity, there is caused no trouble even after the running of about 200 km.

(2) Test Result 2 (Results Judging the End Stage of the Residual Lifetime of the Tire)

In the run-flat running of the vehicle equipped with the judging apparatus, as the running is further continued at a running condition judged that the runnable time until the occurrence of trouble is 60 minutes, the atmosphere temperature inside tire reaches to 101° C. after about 66 minutes and the change ratio T" changes to a positive negative value at this time point and an alarm for announcing the end stage of the residual lifetime is given. As a result that the running is further continued after the alarm, vibrations are generated from the tire after 2 minutes (after total time of about 68 minutes) and the running can not be continued. In this case, the atmosphere temperature inside tire is 103° C. Then, as the troubled tire is cut to examine a trouble site, it has been confirmed that the side-reinforcing rubber is a trouble site because cracks are generated in the side-reinforcing rubber.

And also, when the vehicle is run under a running condition judging no occurrence of trouble by the judging apparatus, the alarm for announcing the end stage of the residual lifetime of the tire is not given and the tire trouble is not caused even after the running of about 280 km.

INDUSTRIAL APPLICABILITY

According to the first to third inventions, when the run-flat tire is continuously run at the present run-flat running condition, there is developed a remarkable effect capable of predicting the runnable time and/or distance until the occurrence of trouble, that is, judging the residual lifetime of the run-flat tire.

And also, according to the fourth to sixth inventions, when the run-flat tire is continuously run at the run-flat state, there is developed a remarkable effect capable of predicting a point of time just before the occurrence of trouble, that is, judging the end stage of the residual lifetime of the run-flat tire.

The invention claimed is:

1. A process for judging a residual lifetime of a run-flat tire during continuous running at a run-flat state in a vehicle equipped with a run-flat tire system comprising run-flat tires and detection units each arranged in the respective tire and for measuring a temperature of the tire, wherein when at least one run-flat tire among the run-flat tires is continuously run at the run-flat state by an abnormal lowering of an internal pressure, the temperature of the run-flat tire continuously running at the run-flat state is measured, and a residual lifetime of the run-flat tire is judged based on the measured temperature,
   wherein the residual lifetime is judged by a runnable time and/or distance calculated on the basis of the measured temperature until a trouble state of the run-flat tire,
   wherein the temperature of the tire is an atmosphere temperature inside the tire,
   wherein after the previous setting of a limit temperature being statistically the occurrence of the trouble state when at least one run-flat tire among the run-flat tires is continuously run at the run-flat state by an extreme lowering of the internal pressure, the atmosphere temperature inside tire is measured in the mn-flat tire during the continuous running at the run-flat state, and a time predicted to reach to the limit temperature is calculated by using the measured values of the atmosphere temperature inside tire and data calculated from these measured values of the atmosphere temperature inside tire, and a calculated running time and/or running distance are rendered into a runnable time and/or distance up to the occurrence of the trouble state in the run-flat tire,
   wherein after a relationship of the atmosphere temperature inside tire T to be measured with respect to a continuously running time t is previously determined as a function f(t) under various run-flat running conditions, when the run-flat tire is continuously run at the present run-flat running condition from a time point of measuring the atmosphere temperature inside tire, the running time and/or the running distance predicted to reach to the limit temperature are calculated by using the function f(t),
   wherein the function f(t) is approximately expressed by $f(t)=T_0-A\exp(-Bt)$, wherein $T_0$ is a predicted saturation reaching temperature and A and B are coefficients, and when the run-flat tire is continuously run at the present run-flat running condition from a time point of measuring the atmosphere temperature inside tire, the running time and/or the running distance predicted to reach to the limit temperature are calculated by using the function f(t).

2. A process for judging a residual lifetime of a run-flat tire during continuous running at a run-flat state according to claim 1, wherein the residual lifetime is judged on the basis of the increasing of the measured temperature.

3. A process for judging a residual lifetime of a run-flat tire during continuous running at a run-flat state according to claim 1, wherein the coefficient B is a constant value, and the coefficient A and the predicted saturation reaching temperature $T_0$ are calculated from the measured temperature and a rate of temperature change thereof per unit time, and when the run-flat tire is continuously run at the present run-flat running condition from a time point of measuring the atmosphere temperature inside tire, the running time and/or the running distance predicted to reach to the limit temperature are calculated by using the function f(t) and substituting the calculated values therefor.

4. A process for judging a residual lifetime of a run-flat tire during continuous running at a run-flat state according to claim 3, wherein the function f(t) differs bordering a transition temperature which is a given temperature lower than the limit temperature, and is approximately expressed by $f(t)=T_0-A\exp(-Bt)$, wherein $T_0$ is a predicted saturation reaching temperature and A and B are coefficients when the atmosphere temperature inside tire is a temperature region lower than the transition temperature, and a case that the predicted saturation reaching temperature $T_0$ is lower than the transition temperature is judged as a safety mode capable of continuously running at the run-flat state over a long time, and a case that the predicted saturation reaching temperature $T_0$ is higher than the transition temperature is judged as a danger mode of predicting the occurrence of the trouble state during continuous running at the run-flat state, and when the run-flat tire is continuously run at the present run-flat running condition from a time point of measuring the atmosphere temperature inside tire, the running time and/or the running distance predicted to reach to the limit temperature are calculated by using the function f(t). run at the present run-flat running condition from a time point of measuring the atmosphere temperature inside tire, the running time and/or the running distance predicted to reach to the limit temperature are calculated by using the function f(t).

5. A process for judging a residual lifetime of a run-flat tire during continuous running at a run-flat state according to claim 1, wherein the run-flat tire is a so-called side-reinforced run-flat tire in which a reinforcing rubber is arranged on at least a sidewall portion of the tire at an inner surface side thereof.

6. A record medium recording a program for judging a residual lifetime of a run-flat tire during continuous running at a run-flat state, in which the program is recorded to conduct the process according to claim 1 with a computer.

7. A process for judging a residual lifetime of a run-flat tire during continuous running at a mn-flat state according to claim 4, wherein the function f(t) is approximately expressed by $f(t)=T_1+Ct$, wherein $T_1$ is a measured temperature and C is a change ratio of temperature measured per unit time, and when the run-flat tire is continuously.

8. An apparatus for judging a residual lifetime of a run-flat tire during continuous running at a run-flat state by conducting the process according to claim 1, which comprises detection units arranged in the respective run-flat tires and capable of measuring at least an atmosphere temperature inside tire in these tires, calculation means for at least calculating a running time and/or a running distance predicted to reach to the limit temperature from the measured value of the atmosphere temperature inside tire when the run-flat tire is continuously run at the present run-flat running condition, and memory means for at least memorizing basic data to be compared with data calculated by the calculation means.

* * * * *